United States Patent Office 3,429,308
Patented Feb. 25, 1969

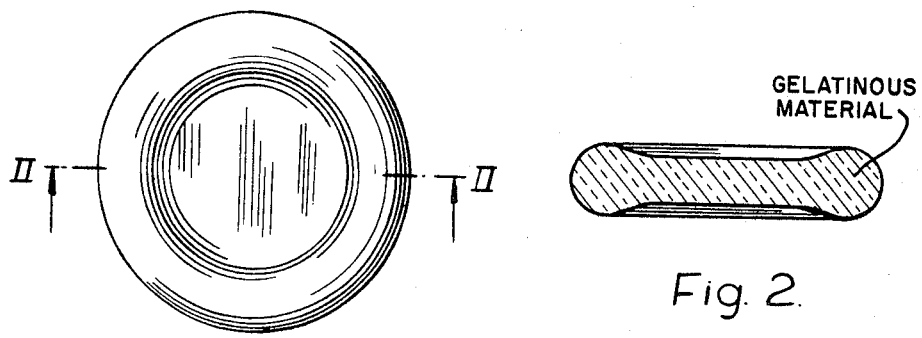
Fig. 1.
Fig. 2.
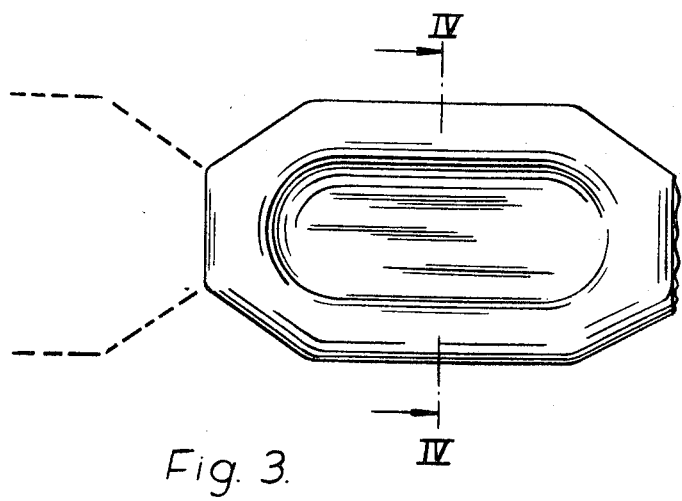
Fig. 3.
Fig. 4.
INVENTOR.
HIGHAM STANLEY RUSSELL
BY Kenwood Ross
ATTORNEY.

3,429,308
METHOD FOR ADMINISTERING DRUGS FROM A VEHICLE ADHERING BY SUCTION TO THE PARABUCCAL CAVITY MUCOUS MEMBRANE
Higham Stanley Russell, 14 Yorkshire St., Rochdale, Lancashire, England
Continuation-in-part of application Ser. No. 451,491, Apr. 28, 1965. This application Jan. 31, 1968, Ser. No. 703,235
Claims priority, application Great Britain, Apr. 30, 1964, 18,090/64
U.S. Cl. 128—1     2 Claims
Int. Cl. A61b *19/00;* A61j *3/07;* A61k *9/00*

ABSTRACT OF THE DISCLOSURE

A method of administering a drug through any species of buccal or sublingual lozenge or pastille or medicated troche, via a suction feature so as to cause the drug-carrying vehicle to adhere, by the suction effect, to the gum of the upper jaw vertically above the canine or incisor teeth.

CROSS REFERENCES TO RELATED APPLICATIONS

A continuation-in-part of application, Ser. No. 451,491, filed Apr. 28, 1965, now abandoned.

BACKGROUND OF THE INVENTION

Field of the invention

Various drugs, for example hormonal preparations, are destroyed or at least inactivated, when administered by way of the digestive tract. Such drugs may even have unwanted side effects on the stomach. Accordingly, such drugs are usually injected into the body, a procedure which is less than convenient in many circumstances, not to mention that it involves certain well known risks. Furthermore, with some drugs, the rate absorption through the alimentary canal is so small that massive overdoses have to be administered orally so as to ensure that a sufficiency of the drug is absorbed in order to achieve a satisfactory result. And in other instances, the drug must be administered gradually and progressively and usually only until a desired effect is obtained, a procedure which is difficult to attain with the means currently available.

With this background in mind, the invention operates in the area of a convenient vehicle for administering drugs which avoids these disadvantages and yet has the advantage of permitting substantially instantaneous discontinuance of administration and comprehends a vehicle for administering a drug in the form of a thin body of resilient gelatinous material having a concave depression on at least one of the major surfaces thereof and being of such shape as to enable it to be introduced into the parabuccal cavity for adherence by suction to the mucous membrane thereat by reason of the concave depression, and wherein the material of the body is impregnated with a drug which is effective when absorbed through the mucous membrane, which drug may be of a nature such that, if administered by swallowing, it would be subject to destruction or inactivation by stomach or intestine saliva or fluid, or would cause unwanted side effects, or would require massive overdoses.

Description of the prior art

Bird et al., 2,552,027 of May 1951, taken in combination with any of Fritz, D. 54,074 of November 1919, Harris, D. 49,515 of August 1916, Hollywood, D. 53,657 of July 1919, Morton, D. 51,707 of January 1918 or Reid, 3,279,995 of October 1966, each showing that lozenges or tablets or the like shaped to have at least one concave major surface, are admittedly old. Bird et al. shows that a resiliently flexible gelatinous material, such as glyco-gelatine, is conventionally employed in forming molded pastilles, lozenges or tablets, so it is expected to employ a conventional medicated lozenge gelatin of Bird et al. in molding any of the conventional concave surface shaped lozenges of Fritz, Harris, Hollywood, Morton, or Reid.

SUMMARY OF THE INVENTION

A method of administering drugs wherein a lozenge is moistened on one side thereof, preferably the concaved side, which side is then pressed firmly onto the gum of the upper jaws above the canine or incisor teeth of the patient to whom the drug is being administered. A suction effect is created when the lozenge is so pressed against the gum.

BRIEF DESCRIPTION OF THE DRAWING

FIG. 1 is a view in plan of a first embodiment of the vehicle of the invention;
FIG. 2 is a sectional view on line II—II of FIG. 1;
FIG. 3 is a view in plan of a second embodiment; and
FIG. 4 is a sectional view on line IV—IV of FIG. 3.

DESCRIPTION OF THE PREFERRED EMBODIMENTS

The drug-administering vehicle comprises a substantially thin body (10 in FIGS. 1 and 2 or 11 in FIGS. 3 and 4) of a gelatinous material, e.g. glyco-gelatine, which acts as a diluent for an absorbable drug dissolved in the gelatinous material prior to body formation.

Body 10, in FIGS. 1 and 2, is circular in configuration and is so formed as to have a generally concave depression 12 in each of its major surfaces. It is of a substantially flexible, but resilient, nature.

Body 11, in FIGS. 3 and 4, is of similar material but is of elongate octagonal shape in configuration having only one concave depression 13 in one of its major surfaces, the other major surface 14 being substantially planar.

These bodies can be made individually, or they can be made as part of a continuous strip. FIG. 3 shows body 11 connected to an adjacent body 16, as part of such a strip, and it will be appreciated that the bodies may be separated from the strip by tearing at the joint 15.

The lozenge is formed so as to have a concave depression on one side, so as to be relatively thin, so as to be of a substantially flexible but resilient nature, and so as to be so shaped as to enable it to be introduced into the parabuccal cavity to become adhered to the mucous membrane thereat by virtue of a suction afforded by means of the concave depression.

The vehicle is made by preparing a liquid solution or melt of a gelatinous material, impregnating the solution or melt with a drug, preferably of hormonal nature, which is effective when absorbed through the mucous membrane of the parabuccal cavity, and forming the impregnated solution of melt into the vehicle.

The material, in main part, is a gelatine which acts as a diluent for a water soluble drug which is dissolved in the gelatine prior to the formation of the lozenge. Contrariwise, the active ingredient may be dissolved in water or other diluent and added to the lozenge by injection, soaking, spraying, dipping or any other method once the lozenge is made.

When it is desired to administer the drug, the lozenge is moistened, or at least a concave side thereof is moistened and the concave side is pressed firmly against the gum of the upper jaw of the patient vertically above the canine or incisor teeth.

As the lozenge is a solution of a drug in a gelatinous material, the rate of absorption in the parabuccal cavity is remarkably constant, especially when compared with the absorption rates of a compressed powder tablet having a similar overall concentration of the drug, but having a particulate character.

During manufacture, the drug is stirred or mixed or otherwise thoroughly dispersed into the batch of glyco-gelatine solution or melt, and the gelatine or analagous material bearing the drug is run into a series of moulds and formed and hardened and dried thereafter until the requisite solid properties are imparted to each so formed vehicle.

Alternatively, the material containing the drum may be cast into sheets or strips from which the vehicles or strips may be punched or pressed, any cutoff material being recirculated into the next melt batch.

A small amount of a preservative, e.g., betanaphthol, and the drug are added to the solution or melt, and there-following, any water is removed, e.g., under a reduced pressure, until the gelatinous material is resiliently flexible.

Other glyco-gelatine based mixtures, or a gelatinous material based on the alginates, or other suitable, for instance, resin-based material may be used. However, a material based on gelatine is preferred.

The material of the embodiment described has a melting point near blood heat, e.g., between 105° and 90° F., and is soft and resiliently pliable at the temperature usual in the mouth.

Furthermore, the material is virtually non-toxic and has no side effects on the patient, is soluble in water, is almost tasteless, and is thus suitable for absorption through the mucous membrane of the gum, i.e., in the parabuccal cavity.

These properties or properties similar thereto are necessary for any alternative material.

A small quantity, e.g., from a few microgrammes to a few milligrammes, of a drug which is of a potent nature is added to the vehicles and such drug may be of various types such as are usually injected or given rectally, because:

(a) They are substantially inactivated in the stomach or intestines when ingested;

(b) They are active in an unwanted manner upon the stomach or intestines when ingested;

(c) They are variable in absorption or effect from patient to patient;

(d) They are slow to act when ingested; or (e) They are of local application.

Typical drug types comprehended for use include:

(1) Hormones, their derivatives and analogues, such as the steroid hormones and the polypeptide hormones, e.g., vasopressin, insulin, oxytocin, testosterone, oestrogens, and progesterones.

(2) Local anaesthetics, e.g., lignocaine hydrochloride and diperondon hydrochloride.

(3) Sympathomimetic amines, e.g., adrenaline, noradrenaline, isoprenaline and amphetamine, and substances which have an opposing action, e.g., ergotamine and dibenzylene.

(4) Substances to be given when a prompt response may be desirable, e.g., vaso-dilators, quick acting diuretics, analgesics, e.g., morphine, and cardio-vascular reactants, e.g., glyceryl trinitrate.

(5) Substances having an optimum dose not previously ascertainable, e.g., oxytocin, digitalin, barbiturates, muscle relaxants, and ganglion blocking agents.

(6) Substances acting on the parasympathetic system, e.g., acetylcholine, anticholinesterases, and physostigmine.

(7) Substances which are potent when absorbed, such as antihistamines, e.g., promethazine, alkaloids, and glycosides such as atropine and hyoscine; nitrates, e.g., amyl nitrite; analeptics, e.g., caffeine and amphetamines, cyto-toxic agents; anticoagulants, e.g., heparin; vitamins, such as cyanocobalamin; and trace elements substances.

(8) Metabolic reactants for clinical investigations, e.g., para-amino-hippuric acid.

Conceivably, any drug which is sufficiently stable, potent, and absorbable may be used.

When it is desired to administer the drug contained in the vehicle, the vehicle is moistened and is pressed firmly against the mucous membrane of the parabuccal cavity (i.e., against the gum of the upper jaw) of the patient with depression 13 (FIGS. 3 and 4) or one of depressions 12 (FIGS. 1 and 2) facing the gum or inner lip. Such firm pressing expels at least some of the air from the depression to produce a suction effect whereby the vehicle adheres to the surface between the latter and inner lip with the result that the material of the vehicle, including the drug, is absorbed into the mucous membrane. Such absorption is allowed to continue until the desired effect resulting from administration from the drug is obtained.

The vehicle offers the advantage that it does not fragment so that it may be easily removed when sufficient of the drug has been absorbed. Accordingly, the vehicle is particularly suitable for administering drugs which produce easily identifiable signs of sufficient absorption thereof. Since the vehicle adheres to the gum and also abuts the adjacent membrane of the lip, even to the extent of adhering to the latter, very little of the drug is washed away or inactivated by any saliva present in the patient's mouth.

A plurality of the vehicles may be administered simultaneously and in the case where the vehicles are produced as a continuous strip, as explained with reference to the FIG. 3 embodiment, such vehicles need not be separated from one another prior to administration.

Due to its adhesive properties and to the fact that the vehicle tends to adopt the shape of the cavity after a very short time, even when several vehicles are administered, the patient can talk, eat, smoke, drink and cough without any fear of ingesting or swallowing the vehicle or vehicles.

Also the resilient nature of the vehicle enables it to be made thin so as to have a high surface to volume ratio and therefore to enable a high absorption rate to be obtained, and maintained at a near constant level due to the relatively small changes in surface area which occur during dissolution.

I claim:

1. A method of administering a potent drug which is effective when absorbed through the mucous membrane comprising the steps of, moistening a major concave surface of a vehicle comprising a drug-impregnated body of resiliently flexible gelatinous material shaped so as to have at least one concave major surface, pressing the concave against the mucous membrane of a jaw of a person to whom the drug is to be administered so that the vehicle is located in the parabuccal cavity with the vehicle adhering by suction to the mucous membrane.

2. A method as claimed in claim 1 wherein the vehicle is removed when sufficient of the drug has been absorbed.

(References on following page)

References Cited

UNITED STATES PATENTS

| | | | |
|---|---|---|---|
| D. 49,515 | 8/1916 | Harris | D1—12 |
| D. 51,707 | 1/1918 | Morton | D1—12 |
| D. 53,657 | 7/1919 | Hollywood | D1—12 |
| D. 54,074 | 11/1919 | Fritz | D1—12 |
| 2,552,027 | 5/1951 | Bird et al. | 167—82 XR |
| 3,279,995 | 10/1966 | Reid | 167—82 |

OTHER REFERENCES

Martindale: The Extra Pharmacopeia, 24th ed., vol. I, pp. 672–673 (1958).

Jermyn, A. C.: "Multiple Suction Cup Dentures," J. Prosth. Dent., 18; pp. 316–325, October 1967.

Jermyn, A. C.: "Dentures With Multiple Suction Cups," Dental Abstracts, 13(4), April 1968.

ELBERT L. ROBERTS, *Primary Examiner.*

S. K. ROSE, *Assistant Examiner.*

U.S. Cl. X.R.

424—14